(12) United States Patent
Thijssen et al.

(10) Patent No.: US 7,917,172 B2
(45) Date of Patent: Mar. 29, 2011

(54) ACCESSORY FOR A PORTABLE ELECTRONIC DEVICE

(75) Inventors: Jeroen Thijssen, Bara (SE); Anders Mellqvist, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1247 days.

(21) Appl. No.: 11/372,070

(22) Filed: Mar. 10, 2006

(65) Prior Publication Data

US 2007/0211721 A1    Sep. 13, 2007

(51) Int. Cl.
*H04B 1/38* (2006.01)
(52) U.S. Cl. .................. 455/557; 455/550.1; 455/556.1
(58) Field of Classification Search .............. 455/550.1, 455/556.1, 557
See application file for complete search history.

(56) References Cited

U.S. PATENT DOCUMENTS

| 7,209,769 B2 * | 4/2007 | Lail et al. ................ 455/557 |
| 2003/0060242 A1 | 3/2003 | Dotzler |
| 2003/0083114 A1 * | 5/2003 | Lavin et al. ................ 455/569 |
| 2003/0095525 A1 | 5/2003 | Lavin et al. |
| 2006/0035668 A1 * | 2/2006 | Li et al. ................ 455/557 |

FOREIGN PATENT DOCUMENTS

| JP | 59-187258 A | 10/1984 |
| JP | 10-341272 A | 12/1998 |
| JP | 2000-078271 A | 3/2000 |
| JP | 2001-268182 A | 9/2001 |
| JP | 2001-292067 A | 10/2001 |
| JP | 2002-027045 A | 1/2002 |
| JP | 2004-046914 A | 2/2004 |
| WO | 02/39703 A2 | 5/2002 |
| WO | WO 02/39703 | 5/2002 |

OTHER PUBLICATIONS

PCT Search Report and Written Opinion, Dec. 27, 2006, 11 pages.

* cited by examiner

*Primary Examiner* — Tuan H Nguyen
(74) *Attorney, Agent, or Firm* — Harrity & Harrity, LLP

(57) ABSTRACT

The invention relates to an accessory (18) for connection to an electrical interface (16) of a portable electronic device (10), which interface comprises a pair of bias voltage providing connection points including a first connection point (42) and a second connection point (44) for biasing a signal providing element (22) that may be provided in the accessory. The accessory includes a first electrical branch comprising a first voltage dividing element (R1) and a first switch (32) that can be actuated mechanically. The branch has a first end to be connected to one connection point (42) in the pair and a second end to be connected to another connection point (46) for changing the voltage level of the connection point connected to the first end to a certain voltage level when the first switch interconnects the first voltage dividing element and this connection point.

14 Claims, 6 Drawing Sheets

ACCESSORY FOR A PORTABLE ELECTRONIC DEVICE

TECHNICAL FIELD OF THE INVENTION

The present invention relates to the field of accessories for portable electronic devices. The present invention more particularly relates to an accessory for connection to an electrical interface of a portable electronic device, where the electrical interface comprises a first connection point intended for supplying electrical power to an accessory.

DESCRIPTION OF RELATED ART

In the field of portable electronic devices and then especially in the field of portable communication devices, such as cellular phones, it is well known to provide accessories such as portable hands free devices and desk stands. A portable hands free device is to be connected to the system connector of the phone and normally comprises a microphone and one or two ear plugs and provides a user of the phone the possibility to engage in phone conversations without holding the phone. A desk stand, which is also to be connected to the system connector of the phone, might include these features, but may also be provided without them and is normally used for charging the battery of the phone.

Nowadays the phones include more and more functions apart from the basic telephone functionality, like for instance cameras, video and music playing abilities. Because of this it is of interest to be able to provide control signals for such functions that are provided in a portable electronic device from an accessory, like for instance signals providing stop and start playing some content, go forwards or backwards in a play list, increase and decrease the volume, take photos etc.

It is known to provide a portable hands free device with a voice activation dialing button. This button is connected between two connection points on the phone system connector that are connected to the microphone in the portable hands free device for providing a voltage for feeding the microphone as well as for receiving microphone signals. When this button is depressed the connections are short-circuited, thereby bypassing the microphone and also lowering the supply voltage of the system connector to a fixed voltage. This is used to signal that voice activated dialing should be started or that an incoming call is to be answered.

There is furthermore often a need to keep the device as small as possible and also keep the production cost as low as possible. Thus the attractiveness of the product is lowered if too many complicated and expensive electronic components are provided in the accessory. If too many active components are placed in a portable hands free device, the power of the battery in the portable electronic device is furthermore drained relatively fast.

There is therefore a need for providing an accessory that can be implemented with a small number of components, is a low cost device, is economical, requires little power and still allows the provision of additional control of the various functions of a portable electronic device.

SUMMARY OF THE INVENTION

The present invention is therefore directed towards solving the problem of providing an accessory that allows the provision of additional control signals that can be used for the various functions of a portable electronic device.

This is generally solved by providing an accessory having at least one electrical branch comprising a first voltage dividing element, and a first switch that can be actuated mechanically, wherein the first branch is connectable between a first connection point of the electrical interface and ground, in order to provide a certain voltage level to the first connection point when the first switch interconnects the first voltage dividing element and the first connection point.

One object of the present invention is thus directed towards providing an accessory that allows the provision of additional control signals that can be used for the various functions of a portable electronic device.

According to a first aspect of the present invention, this object is achieved by an accessory for connection to an electrical interface of a portable electronic device, where the electrical interface comprises a pair of bias voltage providing connection points including a first connection point and a second connection point for biasing a signal providing element that may be provided in the accessory, the accessory comprising:

at least one first electrical branch in a first set of branches comprising
a first voltage dividing element, and
a first switch that can be actuated mechanically, wherein the first branch has a first end to be connected to one connection point in the pair of bias voltage providing connection points and a second end to be connected to another connection point of the electrical interface for changing the voltage level of the connection point connected to the first end to a certain voltage level when the first switch interconnects the first voltage dividing element and this connection point.

A second aspect of the present invention includes the features of the first aspect, further comprising a second branch in the first set of branches comprising a second voltage dividing element and a second switch that can be actuated mechanically, where the second branch has a first and a second end to be connected to the same connection points as the first branch, where the second voltage dividing element changes the voltage level of the connection point connected to the first end to a certain voltage level that is different than the voltage levels provided by other branches connectable to this connection point when the second switch interconnects the second voltage dividing element and this connection point.

A third aspect of the present invention includes the features of the first aspect, further comprising a third branch in the first set of branches only comprising a third switch that can be actuated mechanically and having a first and a second end to be connected to the same connection points as the first branch, where the third branch changes the voltage level of the connection point connected to the first end to a certain voltage level that is different than the voltage levels provided by other branches connectable to this connection point when the third switch interconnects the two connection points.

A fourth aspect of the present invention includes the features of the first aspect, wherein the other connection point is a connection point providing a fixed reference voltage level.

A fifth aspect of the present invention includes the features of the fourth aspect, wherein the other connection point is a third connection point providing a ground potential and the one connection point in the pair of bias voltage providing connection points is the first connection point, which in turn is internally connected to a voltage source in the portable electronic device.

A sixth aspect of the present invention includes the features of the fourth aspect, wherein the other connection point is a third connection point providing a feeding voltage and the one connection point in the pair of bias voltage providing connection points is the second connection point, which in turn is internally connected to ground in the portable electronic device.

A seventh aspect of the present invention includes the features of the first aspect, wherein the other connection point is the other connection point of the pair of bias voltage providing connection points.

An eighth aspect of the present invention includes the features of the first aspect, further comprising a signal providing element, wherein each switch of each branch has two positions, where a first position connects the branch to the one connection point in the pair and a second position connects an end of the signal generating element to the one connection point in the pair, where another end of the signal providing element is intended to be connected to the other connection point of the pair.

A ninth aspect of the present invention includes the features of the eighth aspect, wherein the signal providing element is an adjustable voltage dividing element.

A tenth aspect of the present invention includes the features of the eighth aspect, wherein the signal providing element is a microphone.

An eleventh aspect of the present invention includes the features of the first aspect, wherein all voltage dividing elements are passive elements.

A twelfth aspect of the present invention includes the features of the fifth aspect, further comprising a second set of branches comprising
at least one electrical branch comprising a voltage dividing element and a switch that can be actuated mechanically,
where the branch has a first end to be connected to the second connection point and a second end to be connected to a fourth connection point providing a reference voltage for changing the voltage level of the second connection point to a certain voltage level when the switch interconnects the voltage dividing element and the second connection point.

A thirteenth aspect of the present invention includes the features of the twelfth aspect, comprising a further branch in the second set of branches having a further voltage dividing element and a further switch that can be actuated mechanically, where the further branch has a first and a second end to be connected to the same connection points as the one branch in the second set, and where the further voltage dividing element changes the voltage level of the second connection point to a certain voltage level that is different than the voltage levels provided by other branches connectable to the second connection point when the further switch interconnects the further voltage dividing element and the second connection point.

A fourteenth aspect of the present invention includes the features of the twelfth aspect, further comprising a third set of branches comprising
at least one electrical branch comprising a voltage dividing element and a switch that can be actuated mechanically,
where the branch has a first end to be connected to the first connection point and a second end to be connected the second connection point for changing the voltage level of the first connection point to a certain voltage level that is different than the voltage levels provided by other branches connectable to the first connection point when the switch interconnects the voltage dividing element and the first connection point.

A fifteenth aspect of the present invention includes the features of the fourteenth aspect, comprising a further branch in the third set of branches having a further voltage dividing element, and a further switch that can be actuated mechanically, wherein the further branch has a first and a second end to be connected to the same connection points as the one branch in the third set, where the further voltage dividing element changes the voltage level of the first connection point to a certain voltage level that is different than the voltage levels provided by other branches connectable to the first connection point when the further switch interconnects the further voltage dividing element and the first connection point.

A sixteenth aspect of the present invention includes the features of the fourteenth aspect, comprising a further branch in the third set of branches only comprising a further switch that can be actuated mechanically and having a first and a second end to be connected to the same connection points s the one branch of the third set, where the further branch changes the voltage level of the first connection point to a certain voltage level that is different than the voltage levels provided by other branches connectable to the first connection point when the further switch directly interconnects the first and the second connection points.

A seventeenth aspect of the present invention is directed towards an accessory for connection to an electrical interface of a portable electronic device, where the electrical interface comprises a pair of bias voltage providing connection points including a first connection point and a second connection point for biasing a signal providing element that may be provided in the accessory, the accessory comprising:
at least one first electrical branch in a first set of branches comprising
   means for dividing a voltage, and
   means for switching the first branch to one connection point in the pair of bias
   voltage providing connection points, where the means for switching can be actuated mechanically,
wherein the first branch has a first end to be connected to the one connection point in the pair of bias voltage providing connection points and a second end to be connected to another connection point of the electrical interface for changing the voltage level of the connection point connected to the first end to a certain voltage level when the first switch interconnects the first voltage dividing element and this connection point.

Another object of the present invention is directed towards providing a method that detects additional control signals from an accessory when the accessory is provided with a signal generating element.

According to an eighteenth aspect of the present invention, this object is achieved by a method of determining if a switch has been actuated in an accessory connected to an electrical interface of a portable electronic device, the electrical interface comprising a pair of bias voltage providing connection points including a first connection point and a second connection point, where the accessory comprises a signal providing element to be connected between and biased by the first and second connection points and at least one first electrical branch in a set of branches provided in parallel with the signal providing element, the branch including a first voltage dividing element and a first switch that can be actuated mechanically, the method comprising the steps of:
   detecting a voltage level change between the first and the second connection points,
   determining a noise level associated with the voltage level change,
   comparing the noise level with a noise level associated with use of the signal providing element, and
   determining if an actuation of the switch has been made based on the comparison.

Another object of the present invention is directed towards providing a portable electronic device that detects additional control signals from an accessory when the accessory is provided with a signal generating element.

According to a nineteenth aspect of the present invention, this object is achieved by a portable electronic device to be connected to an accessory having a signal providing element and at least one first electrical branch in a set of branches provided in parallel with the signal providing element, the branch including a first voltage dividing element and a first switch that can be actuated mechanically, the portable electronic device comprising:

an electrical interface having a pair of bias voltage providing connection points including a first and a second connection point for being connected to two ends of the branch and the signal providing element for biasing the signal providing element and receiving signals and switch actuation indications via the first and second connection points, and a control unit arranged to detect a voltage level change between the first and the second connection points, determine a noise level associated with the voltage level change, compare the noise level with a noise level associated with use of the signal providing element, and determine if an actuation of the switch has been made based on the comparison.

Another object of the present invention is directed towards providing a computer program product that detects additional control signals from an accessory when the accessory is provided with a signal generating element.

According to a twentieth aspect of the present invention, this object is achieved by an computer program product for determining if a switch has been actuated in an accessory connected to an electrical interface of a portable electronic device, the electrical interface comprising a pair of bias voltage providing connection points including a first connection point and a second connection point, where the accessory includes a signal providing element to be connected between and biased by the first and second connection points and at least one first electrical branch in a set of branches provided in parallel with the signal providing element, the branch including a first voltage dividing element and a first switch that can be actuated mechanically, the computer program product comprising computer program code for making the portable electronic device perform, when the code is provided in the device:

detect a voltage level change between the first and the second connection points, determine a noise level associated with the voltage level change, compare the noise level with a noise level associated with use of the signal providing element, and determine if an actuation of the switch has been made based on the comparison The present invention has many advantages. It does not need a microprocessor. It is therefore simple in construction which makes the accessory a low cost device that is easy to manufacture. It does not need a power supply of its own to function, but uses the power provided by the portable electronic device. The power needed is furthermore very low. The accessory does not need the use of any additional connection points in the electrical interface of the portable electronic device, which is good since these are often standardised and cannot be changed.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

Figure 1:
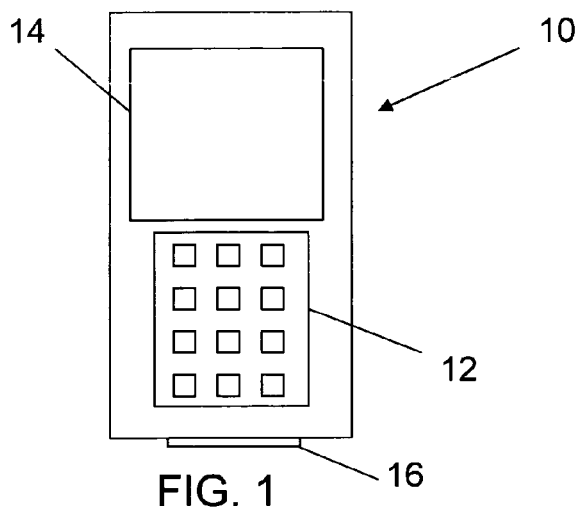
FIG. 1 schematically shows a front view of a cellular phone.

The present invention relates to an accessory for a portable electronic device, such as a portable communication device, for instance a cellular phone. Such a phone 10 is schematically shown in a front view in FIG. 1. The phone 10 includes a display 14, which may be a liquid crystal display, a key pad 12 including a number of keys and an electrical interface in the form of a system connector 16 for connection of an accessory. The phone normally includes an antenna as well. However nowadays this is normally provided in the interior of the phone 10. A cellular phone is just one example of a portable electronic device. It can also be such things as a lap top computer, a palm top computer, an electronic organizer, a smartphone, a communicator or a gaming machine.

Figure 2:
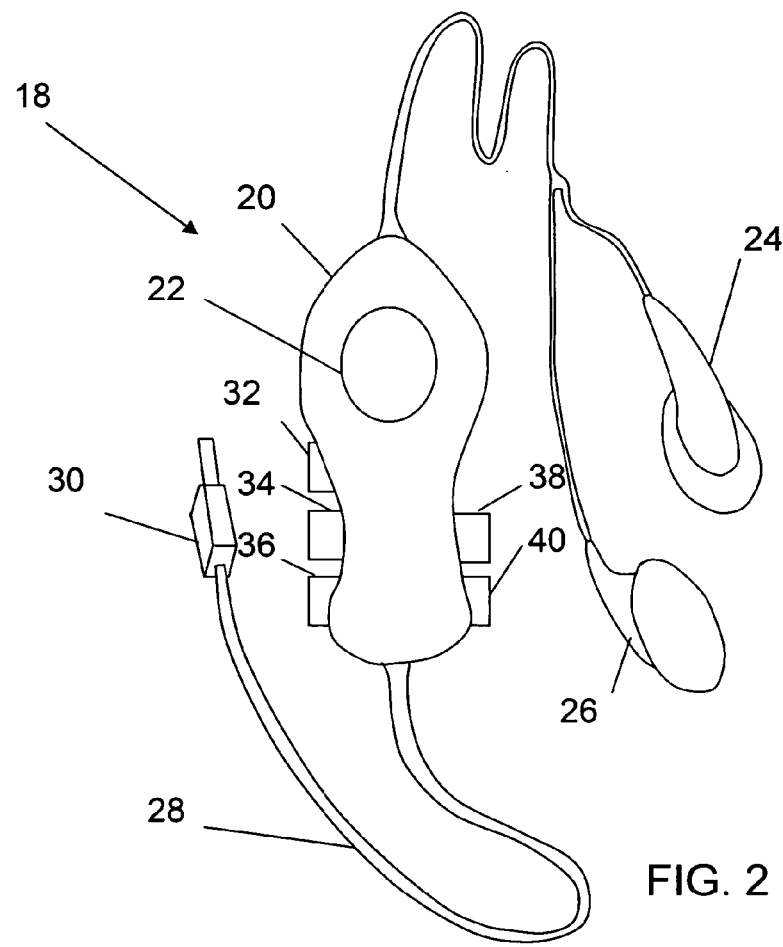
FIG. 2 schematically shows an accessory according to a first embodiment of the present invention in the form of a hands-free device for connection to the phone of FIG. 1, FIG. 3 schematically shows the electrical elements of the hands-free device of FIG. 2 connected to a system connector of the phone of FIG. 1, FIG. 4 schematically shows an accessory according to a second embodiment of the present invention in the form of a desk stand for connection to the phone of FIG. 1, FIG. 5 schematically shows the electrical elements of the desk stand of FIG. 4 connected to a system connector of the phone of FIG. 1, FIG. 6 schematically shows the electrical elements of a variation of a hands-free device connected to a system connector of the phone of FIG. 1, FIG. 7 schematically shows the electrical elements of another variation of a hands-free device connected to a system connector of the phone of FIG. 1.

FIG. 2 schematically shows an accessory according to a first embodiment of the present invention. The accessory is here a portable hands free device 18 which includes a plug 30 for insertion into the system connector of the phone and a cord 28 connected to a main body 20 including a microphone 22 and a number of buttons 32, 34, 36, 38 and 40, which each is connected to a mechanical switch. The main body 20 is furthermore connected to a pair of earphones 24 and 26 via a further cord. The microphone 22 is to be connected to two connection points of the system connector as are the ear phones 24 and 26. The present invention is generally directed towards the provision of the buttons and the microphone, which will now be described in more detail.

Figure 3:
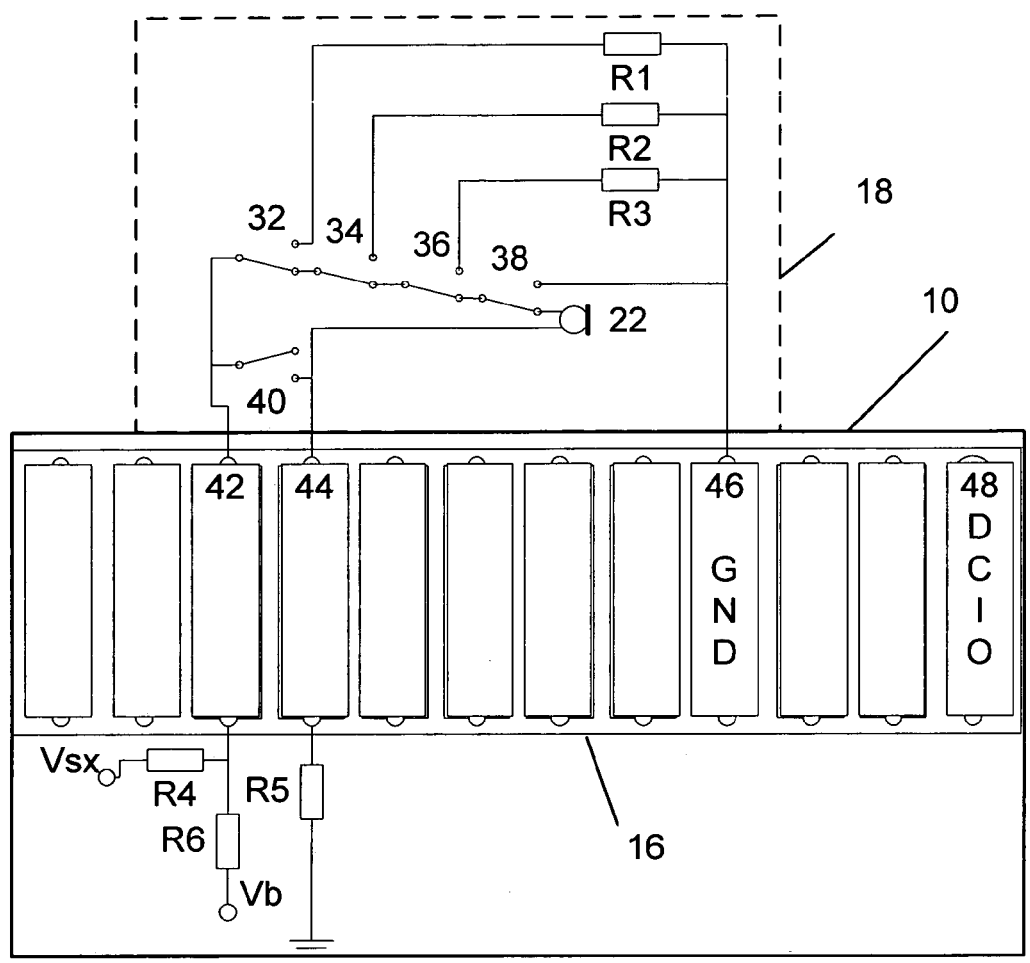

FIG. 3 schematically shows the different elements of the hands free device 18 connected to the system connector 16. The system connector 16 includes a number of connection points, where a pair of bias voltage providing connection points that is made up of a first connection point 42 and a second connection point 44 together provide a voltage that biases the microphone 22. In this way the first and second connection points 42 and 44 receive a voltage signal from the microphone that can be used in phone calls involving the phone while at the same time providing a biasing voltage that biases the microphone 22. There is also a third connection point 46 that provides a ground potential GND, and a fourth connection point 48 that provides a feeding potential DCIO. In the interior of the phone 10 there is a voltage source Vb connected to the first connection point 42 via a first phone resistor R6 and the second connection point 44 is connected to ground via a second phone resistor R5. Between the first phone resistor R6 and the first connection point 42, there is provided a third phone resistor R4 which leads to a measuring point, where a signal Vsx is to be detected. This signal will be described later on. The first and second phone resistors R6 and R5 are normally provided with the same value, i.e. they have the same size and resistance, while the third phone resistor R4 is much bigger than these resistors. As can be seen in the figure there are a number of further connection points of which two can be used for supplying a speaker signal to the two earphones of FIG. 2.

Each button of FIG. 2 actuates a corresponding switch 32, 34, 36, 38 and 40, where each switch has received the same reference numeral as the button in question. Thus each switch can be mechanically actuated by a user of the portable hands free device 18. The portable hands free device 18 furthermore includes a number of electrical branches that are provided in a first set of branches, where a first branch has a first end to be connected to the first connection point 42 and a second end to be connected to the third connection point 46 and includes a first switch 32 and a first passive voltage dividing element that is here a first resistor R1. A second branch has a first end to be connected to the first connection point 42 and a second end to be connected to the third connection point 46 and includes a second switch 34 and a second passive voltage dividing element that is here a second resistor R2. A third branch has a first end to be connected to the first connection point 42 and a second end to be connected to the third connection point 46 and only includes a third switch 38. There is also a fourth branch that has a first end to be connected to the first connection point 42 and a second end to be connected to the third connection point 46 and including a fourth switch 36 and a third passive voltage dividing element that is here a third resistor R3. The first second and third resistors R1, R2 and R3 all have different sizes or resistance values. Each of these switches 32, 34, 36 and 38 has two positions, where a first position connects the corresponding branch to the first connection point 42 and the other connects the first end of the microphone 22 to this connection point 42. Finally there is a VAD (Voice Activation Dialing) switch 40 provided, which selectively short circuits the first and the second connection points 42 and 44 when the device 18 is connected to the phone.

When the accessory 18 is connected to the system connector 16 in normal operation all the switches 32-38 connect the microphone 22 to the first connection point 42 and thereby the user of the portable hands free device may speak into the microphone 22 and voice signals transmitted to the phone via the first and second connection points 42 and 44. The user may here also press the VAD button 40 and when this is done the supply voltage provided from the phone is halved because of the equal sized first and second phone resistors R6 and R5. This voltage level is used for signaling to the phone 10 that voice activation dialing is to be made. Thereafter voice input by the user via the microphone 22 is used by the phone when selecting phone numbers to dial.

As mentioned before the phone 10 has a number of different functions that it would be beneficial to control from the portable hands free device 18. The different branches all allow the provision of different discrete voltage levels on the first connection point 42 because of the different sized resistors R1, R2 and R3 and the lack of a resistor in one branch. These different discrete voltage levels can then all be measured at the output Vsx provided by the third phone resistor R4 in the interior of the phone, in order to control one or more functions. The different voltage levels are then provided according to the voltage division made by the combination of the first phone resistor R6 and the voltage dividing element of the branch connected.

As a non-limiting example, the use of the buttons will be applied on the playing of some content in the phone, like for instance the playing of some music file in a play list. The first switch 32 here has two functions. When it connects the first branch to the first connection point 42, the voltage level Vsx provided is used either to control a volume decrease or to indicate a rewind/back stepping operation for some content. In the same way the second switch 34 has two functions. When it connects the first branch to the first connection point 42, the voltage level Vsx provided is used either to play or to pause playing some content. The fourth switch 36 likewise has two functions. When it connects the first branch to the first connection point 42, the voltage level provided is used either to control a volume increase or to indicate a winding or forward stepping operation for the content. The third switch 38 in the third branch is here used as a setting indication for the other switches 32, 34, 36, i.e. once it grounds the first connection point 42, thus making Vsx zero, it changes setting for the other switches in the other branches from one function to the other. All in all the different branches provide different discrete voltage levels that can be used by the phone to control one or more functions.

Naturally the signals are not limited to playing content, either music and/or video. They can for instance also be used for selecting channels, like TV channels or radio channels or be used for controlling a camera or be used for controlling any function of the phone.

It should here be realised that the third switch may not be a setting switch, but can be directly linked with a function and then each switch would of course only be associated with one function.

Figure 4:
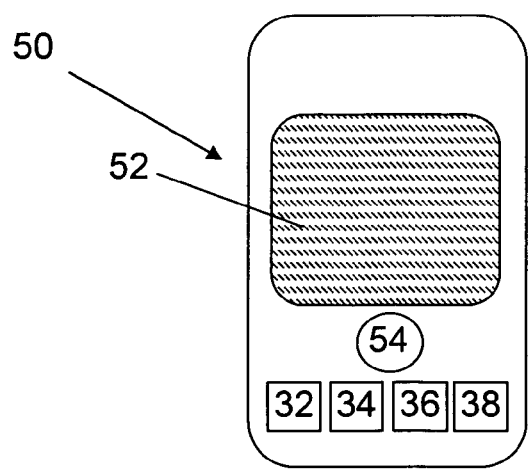

As mentioned before the invention is not limited to portable hands-free devices but can also be applied in other accessories such as for instance in a desk stand. FIG. 4 schematically shows a second embodiment of the present invention provided as such a desk stand 50 that includes a cavity 52 where the phone is to be placed. In the bottom of the cavity an interface for connecting to the system connector of the phone is provided (not shown). The desk stand also includes buttons 32, 34, 36 and 38 that correspond to the buttons having the same reference numerals in FIG. 2 as well as a circular knob 54.

Figure 5:
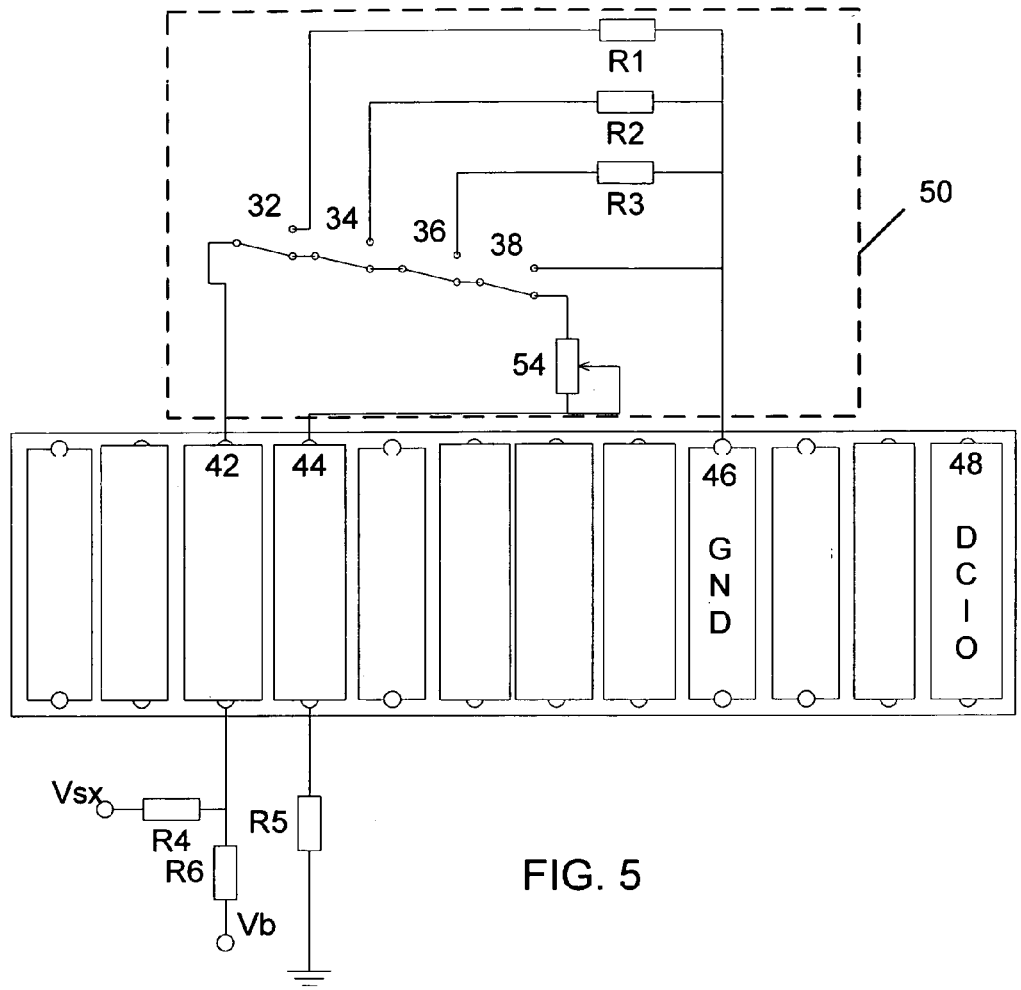

FIG. 5 schematically shows the different elements of the desk stand 50 connected to the system connector 16, where the elements that are similar to the ones provided in FIG. 3 have received the same reference numerals. Here there is a first, second, third and fourth branch with switches 32, 34, 38 and 36 and resistors R1, R2 and R3 in the same way as was described in relation to FIG. 3. The difference between FIG. 3 and 5 is that there is no VAD switch and no microphone in FIG. 5. Instead of the microphone there is provided a signal generating element in the form of a resistor 54, the resistance of which may be varied by a user of the desk stand 50. The resistor 54 is thus an adjustable voltage dividing element. This resistor 54 is actuated when the knob having the same reference numeral is turned and may be a potentiometer. In operation the first fourth switches 32-38 are operated and used in the same way as in the first embodiment. However, the resistor 54 having a variable resistance may here be operated by the user in order to provide a linearly varying voltage level to the first connection point 42. This may be used as a voltage control signal for linearly changing the volume of sound output by the phone. The voltage provided by the resistor 54 should lie in a range that is different from the range provided by the first to fourth branches. This feature allows a gradual adjustment of the volume, which is desirable for many users instead of a stepping function.

It should be realised that the user need not use a knob for actuating the resistor 54, but that for instance a slider may be used. The use for sound adjustment is furthermore just one example. It can be used for many other adjustments, like for instance bass, treble or balance regarding sound and contrast or colour regarding images or any other adjusting of the phone that it is desirable to provide linearly. It is furthermore possible that one of the switches 32, 34, 36 and 38 can be used as a setting switch, for instance the third switch 38 that selects what property is to be adjusted.

It is possible that it is desirable to provide further buttons, either because it is not desirable to have a set button or because there is a need for providing more various control from an accessory.

Figure 6:
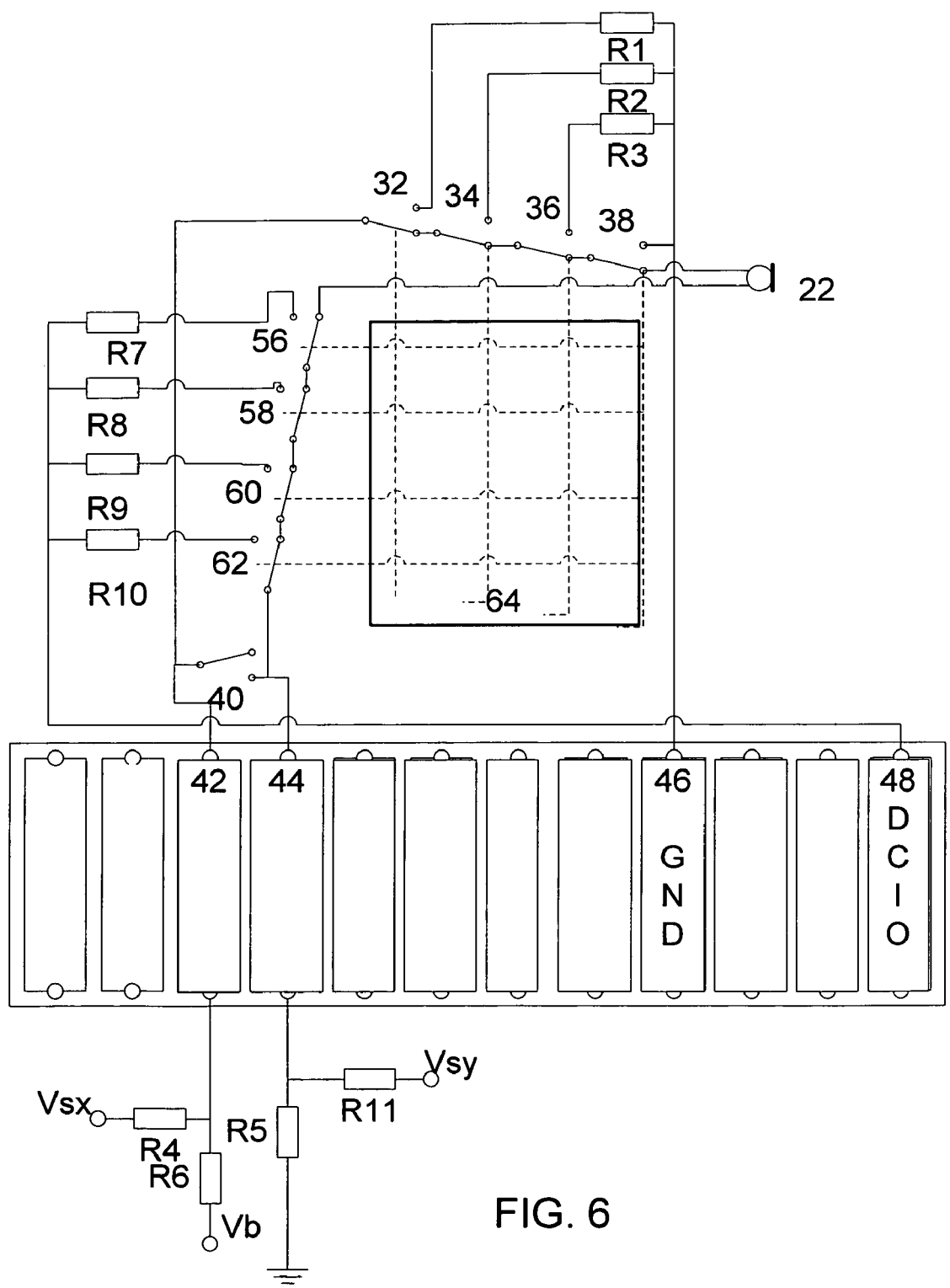

According to a variation of the present invention, this may be realised through providing a second set of branches in addition to the first set of branches. FIG. 6 schematically outlines such a solution for a portable hands free device. It should be realised that this solution may also be provided for a desk stand.

In FIG. 6 there is just as in FIG. 3, a first set of branches comprising switches 32, 34, 36 and 38 and resistors R1, R2 and R3 that can get connected to the first connection point 42. However there is also a second set of branches that can get connected between the second connection point 44 and the fourth connection point 48.

In the second set a first branch has a first end to be connected to the second connection point 44 and a second end to be connected to the fourth connection point 48 and includes a switch 56 and a passive voltage dividing element that is here a resistor R7. A second branch has a first end to be connected to the second connection point 44 and a second end to be connected to the fourth connection point 48 and includes a switch 58 and a passive voltage dividing element that is here a resistor R8. A third branch has a first end to be connected to the second connection point 44 and a second end to be connected to the fourth connection point 48 and includes a switch 60 and a passive voltage dividing element that is here a resistor R9. There is also a fourth branch that has a first end to be connected to the second connection point 44 and a second end to be connected to the fourth connection point 48 and including a switch 62 and a passive voltage dividing element that is here a resistor R10. These resistors R7, R8 and R9 and R10 all have different sizes or resistance values. Each of the switches 56, 58, 60 and 62 has two positions, where a first position connects the corresponding branch to the second connection point 44 and the other connects the second end of the microphone 22 to this connection point.

In FIG. 6 there is furthermore provided a fourth phone resistor R11 connected between the second phone resistor R5 and the second connection point 44 in order to provide a second voltage signal Vsy that is obtained on the second connection point through dividing the feeding voltage DCIO provided by the fourth connection point 48 and the resistance provided by the branch connected. The fourth phone resistor R11 is much bigger than the second phone resistor R5. The hands free device furthermore comprises a keypad 64 having different depression zones arranged as a matrix or in rows and columns. Here the switches of the first set of branches are arranged in a column, while the switches of the second set of branches are arranged in a row. By depressing a zone on the keypad 64 one of the switches in the first set of branches lowers the voltage on the first connection point from Vb to a lower voltage defined by the branch and one of the switches of the second set of branches connects a resistance to the second connection point so that this connection point receives a voltage that is decided by dividing the voltage provided by the fourth connection point. Thus here one key depression provides switching of two switches. This solution allows the provision of 16 different key input combinations that are detected in the phone via the voltages Vsx and Vsy.

Figure 7:
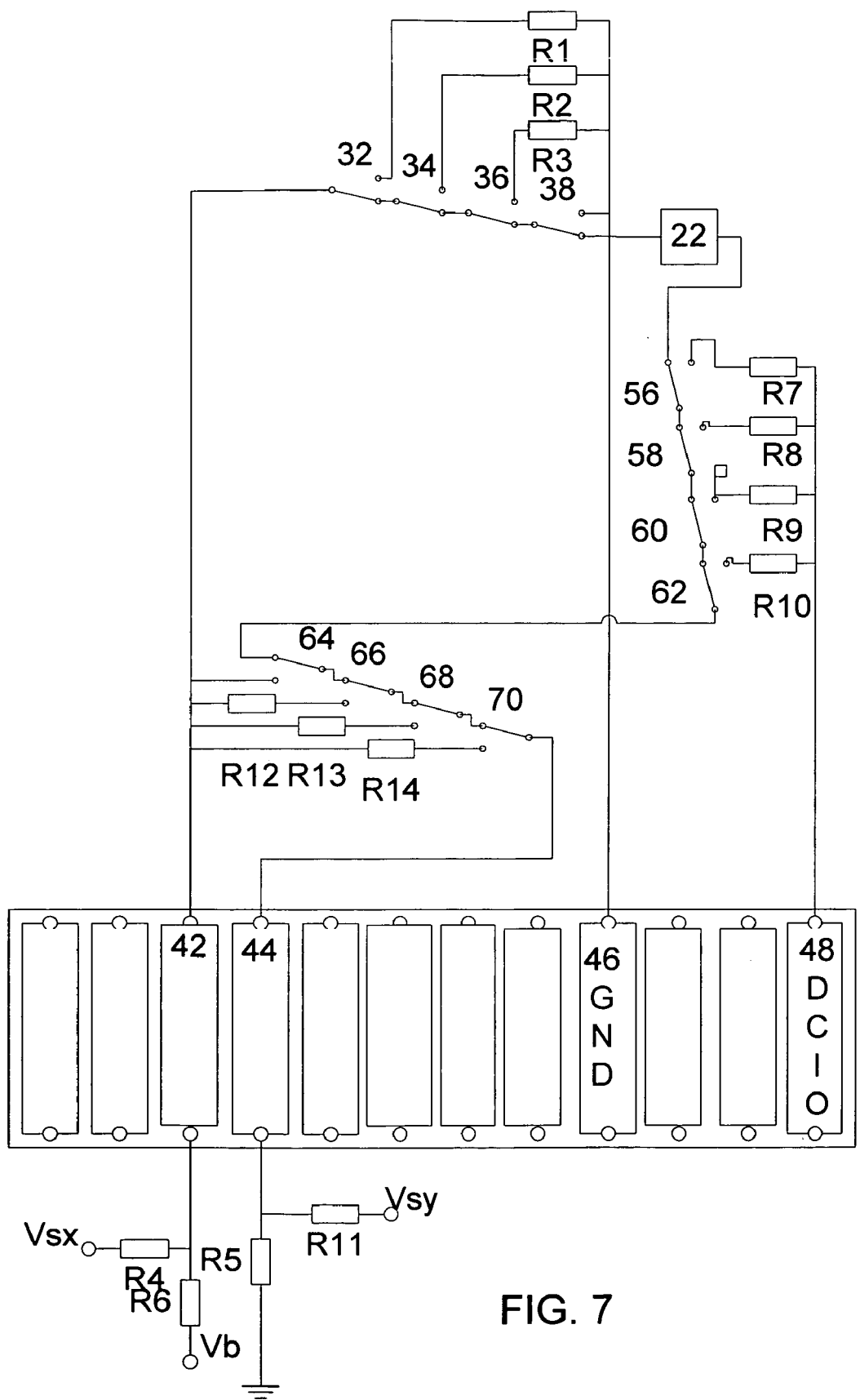

In case even further inputs are needed, it is possible to provide a third set of branches. FIG. 7 schematically outlines such a variation of the invention for a portable hands free device. It should also here be realised that this solution may also be provided for a desk stand.

In FIG. 7 there is just as in FIG. 6, a first set of branches comprising switches 32, 34, 36 and 38 and resistors R1, R2 and R3 that can get connected to the first connection point 42 as well as a second set of branches comprising switches 56, 58, 60 and 62 and resistors R7, R8, R9 and R10 that can get connected to the second connection point 44. However there is also a third set of branches that can get connected between the first connection point 42 and the second connection point 44.

In the third set a first branch has a first end to be connected to the first connection point 42 and a second end to be connected to the second connection point 44 and only includes a switch 64. A second branch has a first end to be connected to the first connection point 42 and a second end to be connected to the second connection point 44 and includes a switch 66 and a passive voltage dividing element that is here a resistor R12. A third branch has a first end to be connected to the first connection point 42 and a second end to be connected to the second connection point 44 and includes a switch 68 and a passive voltage dividing element that is here a resistor R13. There is also a fourth branch that has a first end to be connected to the first connection point 42 and a second end to be connected to the second connection point 44 and including a switch 70 and a passive voltage dividing element that is here a resistor R14. These resistors R12, R13 and R14 all have different sizes or resistance values. Each of the switches 64, 66, 68 and 70 has two positions, where a first position connects the corresponding branch to the second connection point 44 and the other connects the second end of the microphone 22 to this connection point.

The connection of the first and the second set of branches to the first and second connection points are here provided in the same way as described above. By activating a switch in the third set of branches the voltage on the first connection point is changed or lowered from Vb to a lower voltage defined by the resistance of the branch in question and the first and second phone resistors R6 and R5. A key depression signal is then detected via the third phone resistor R4 and the fourth phone resistor R11 through the potential values Vsx and Vxy.

In this variation the switching made in the first and second branches can be detected simultaneously, while the switching made in the third branch cannot be combined with detection of switching in the other sets of branches. Here it is possible to provide four additional key inputs, so that twenty different key inputs are possible if a matrix solution is used or 12 different inputs if each switch corresponds to a key.

In order to help in discriminating between the use of the microphone and the depression of a key a microphone amplifier inside the phone may be used to check the noise level of a detected signal, which noise level is much higher when a microphone is used than when a key is depressed.

Figure 8:
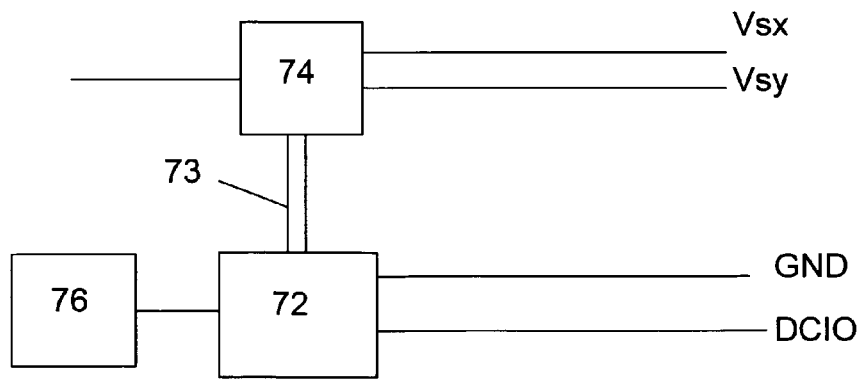
FIG. 8 shows a block schematic of units used for switch actuation detection in the phone of FIG. 1.

FIG. 8 shows a block schematic of relevant parts of the phone used for detecting actuation of switches according to the embodiment in FIG. 7. The phone includes a control unit 72 that receives the signals GND and DCIO. The control unit 72 is furthermore connected to a microphone amplifier 74 via a data bus 73 on which it receives digital versions of noise signals and the signals Vsx and Vsy. The control unit 72 is also connected to a reference value store 76. The control unit 72 identifies that a switch in the first set of branches has been actuated by comparing the voltage defined by Vsx and GND with reference voltage levels, that a switch in the second set of branches has been actuated by comparing the voltage defined by DCIO and Vsy with reference voltage levels and that a switch in the third set of branches has been actuated by comparing the voltage defined by Vsx and Vsy with reference voltage levels.

Figure 9:
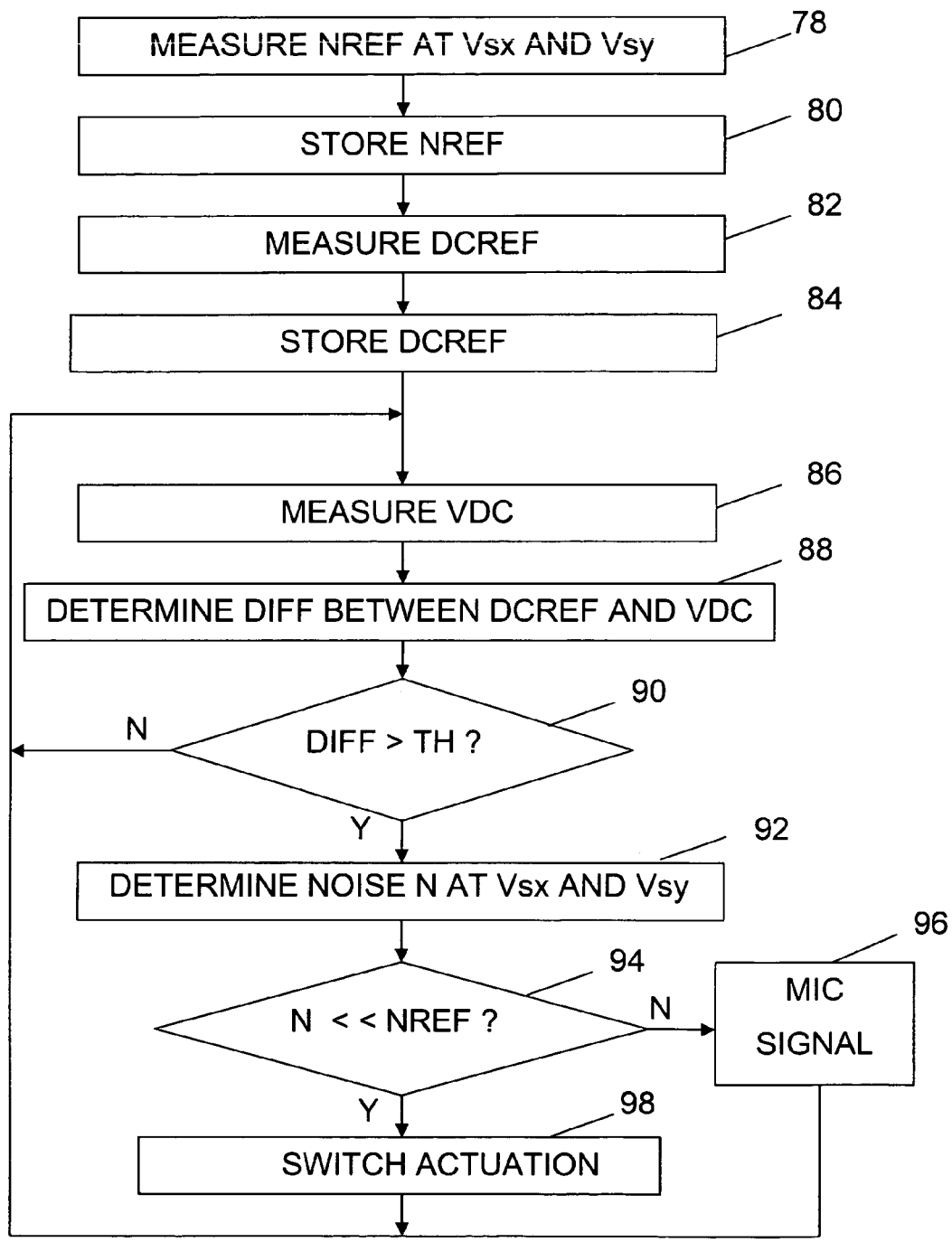
FIG. 9 shows a flow chart of a method of performing switch actuation detection in the units of FIG. 8.

However, when determining that a switch in the third set of branches has been actuated, there is a risk that the use of the microphone might accidentally be determined as a switch actuation. In order to avoid this situation the control unit 72 performs the following method steps that are also outlined in a flow chart in FIG. 9.

Before use of the switches or the microphone, the control unit 72 measures a noise reference value NREF at the input of the microphone amplifier 74, step 78, i.e. a noise reference value of the difference signal between Vsx and Vsy that is associated with the use of the microphone. This noise reference value NREF is then stored in store 76, step 80. Thereafter the control unit 72 measures a DC reference voltage at Vsx and Vsy, step 82. This DC reference voltage DCREF is then also stored in reference value store 76, step 84. When this has been done, the control unit 72 is ready to detect switch actuations in the third set of branches.

The control unit 72 then measures the DC voltage VDC through Vsx and Vsy provided by the microphone amplifier 74 via data bus 73, step 86, and detects a voltage level change through determining the difference DIFF between the measured DC voltage VDC and the reference voltage DCREF, step 88. The control unit 72 then compares this difference DIFF with a threshold TH, step 90, which threshold TH is set according to a voltage level change that corresponds to a switch actuation in one of the branches of the third set providing a voltage being closest to the reference voltage DCREF. If the threshold TH is not exceeded, step 90, the control unit 72 returns and yet again measures the DC voltage VDC through Vsx and Vsy provided by the microphone amplifier 74 via data bus 73, step 86, which may be done after a pre-determined time period of for instance 500 ms. If however the threshold TH is exceeded, step 90, a noise level associated with the voltage change is determined through determining the noise N at the input of the microphone amplifier 74, step 92. The noise N is then compared with the noise reference value NREF, step 94. A determination of if a switch has been actuated is then made based on this comparison. If the noise value N is considerably smaller, a switch has been actuated, step 98, and the actuation is then handled by the control unit 72 for performing an operation of the phone. If however the noise value N is not much smaller, step 94, the microphone is being used instead. In this case there is a microphone signal, step 96, that is handled by the microphone amplifier and the control unit 72 is idle. Thereafter the control unit 72 yet again measures DC voltage VDC through Vsx and Vsy provided by the microphone amplifier 74 via data bus 73, step 86, after the suitable time interval. In this way the control unit continuously monitors the voltage levels as long as the accessory is connected.

The control unit is preferably provided in the form of a microprocessor with corresponding program code for performing the method steps. The reference value store is preferably a memory of suitable type, like ROM or RAM memory. The program can furthermore be provided on a data carrier such as a memory stick which performs the method when being loaded into the phone.

The present invention has many advantages. It does not need a microprocessor in the accessory. It is therefore simple in construction which makes it a low cost device that is easy to manufacture. It does not need a power supply of its own to function, but uses the power provided by the portable electronic device. The power needed is furthermore very low. The accessory does not need the use of any additional connection points in the electrical interface of the portable electronic device, which is good since these are often standardised and hard to change. All that is needed in the phone is the implementation of software for detecting voltage levels and mapping them to different function selections.

The present invention can be varied in many ways apart from the ones already mentioned. The passive voltage dividing elements in the branches need not be resistors. It is also possible to use diodes. There can furthermore be more or fewer branches in each set, for instance only one branch. The switches in the branches may furthermore be connected so that actuation of one switch disables the actuation of the switches of the other branches and then perhaps only for the same set of branches. The solution according to the second embodiment may be provided in the first embodiment and vice versa. It should furthermore be noted that a signal generating element need not be provided in an accessory at all, i.e. there need not be a microphone or variable resistance. In this case the switches of the branches do not need to have two positions but only connect or disconnect a branch to a connection point of the system connector. It should also be realised that any combination of the different sets of branches may be provided. An accessory might therefore be provided with only the first sets of branches, only the second set of branches, only the third set of branches, only the first and second set of branches, only the first and third set of branches, only the second and third sets of branches as well as with all three sets of branches as in FIG. 7. When only the third set of branches are used, the number of leads necessary for detecting button depressions are limited to a minimum, which makes the accessory even more simple and further lowers the production cost. Therefore the present invention is only to be limited by the following claims.

The invention claimed is:

1. An accessory for connection to an electrical interface of a portable electronic device, where the electrical interface comprises a pair of bias voltage providing connection points including a first connection point and a second connection point for biasing a signal providing element of the accessory, the accessory comprising:
a set of electrical branches comprising at least a first electrical branch, the first electrical branch comprising:
a first voltage dividing element,
a first switch that is arranged to be actuated mechanically, a first end that connects to the first connection point in the pair of bias voltage providing connection points, and a second end that connects to the second connection point of the electrical interface to change a voltage level of the first connection point connected to the first end to a different voltage level when said first switch interconnects said first voltage dividing element and the first connection point; and a second electrical branch in the set of branches, the second electrical branch comprising:

a second voltage dividing element, a second switch that is arranged to be actuated mechanically, and third and fourth ends that connect to the same connection points as the first and second ends of the first branch, where said second voltage dividing element changes the voltage level of the connection point connected to the third end to a voltage level that is different than voltage levels provided by other branches that connect to the connection point connected to the third end when said second switch interconnects said second voltage dividing element and the connection point connected to the third end.

2. The accessory according to claim 1, where the second connection point provides a fixed reference voltage level.

3. The accessory according to claim 2, where the second connection point provides a ground potential, and the first connection point is internally connected to a voltage source in the portable electronic device.

4. The accessory according to claim 3, further comprising another set of electrical branches, the other set of electrical branches comprising:

at least one electrical branch comprising:

a voltage dividing element, a switch that is arranged to be actuated mechanically, a fifth end that connects to the second connection point, and a sixth end that connects to a third connection point that provides a reference voltage to change the voltage level of the second connection point to another voltage level when said switch interconnects said voltage dividing element and the second connection point.

5. The accessory according to claim 4, where the other set of electrical branches further comprises:

another electrical branch, where the other electrical branch of the other set of electrical branches comprises:

another voltage dividing element, another switch that is arranged to be actuated mechanically, and seventh and eighth ends that connect to the same connection points as the at least one electrical branch in the second set of electrical branches, and where the other voltage dividing element changes the voltage level of the second connection point to a voltage level that is different than voltage levels provided by other branches that connect to the second connection point when said other switch interconnects said other voltage dividing element and the second connection point.

6. The accessory according to claim 4, further comprising a third set of electrical branches comprising:

at least one electrical branch comprising:

a voltage dividing element, a switch that is arranged to be actuated mechanically, a seventh end to connect to the first connection point, and an eighth end to connect to the second connection point for changing the voltage level of the first connection point to a voltage level that is different than voltage levels provided by other branches that connect to the first connection point when said switch of the at least one electrical branch of the third set of electrical branches interconnects said voltage dividing element and the first connection point.

7. The accessory according to claim 6, further comprising:

another electrical branch in the third set of electrical branches, where the other electrical branch in the third set of electrical branches comprises:

another voltage dividing element, another switch that is arranged to be actuated mechanically, ninth and tenth ends to connect to the same connection points as said seventh and eighth ends of the at least one electrical branch in the third set, where said other voltage dividing element changes the voltage level of the ninth connection point to a voltage level that is different than voltage levels provided by other electrical branches that connect to the ninth connection point when said other switch interconnects said other voltage dividing element and the ninth connection point.

8. The accessory according to claim 6, further comprising:

another electrical branch in the third set of electrical branches, where the other electrical branch in the third set of electrical branches comprises:

another switch that is arranged to be actuated mechanically, ninth and tenth ends to connect to the same connection points as said seventh and eighth ends of the at least one electrical branch of the third set, where said other electrical branch changes the voltage level of the first connection point to a voltage level that is different than voltage levels provided by other electrical branches that connect to the first connection point when said other switch directly interconnects the first and the second connection points.

9. The accessory according to claim 2, where the second connection point provides a feeding voltage, and the first connection point in the pair of bias voltage providing connection points is internally connected to ground in the portable electronic device.

10. The accessory according to claim 1, further comprising:

a signal providing element, where each switch of each electrical branch in the set of electrical branches has two positions, where a first position of a particular switch of a particular electrical branch connects said particular electrical branch to the first connection point, and where a second position of the particular switch of the particular electrical branch connects an end of the signal generating element to said first connection point, where another end of the signal providing element is connected to the second connection point.

11. The accessory according to claim 10, where the signal providing element is an adjustable voltage dividing element.

12. The accessory according to claim 10, where the signal providing element is a microphone.

13. The accessory according to claim 1, where the first or second voltage dividing element is a passive element.

14. An accessory for connection to an electrical interface of a portable electronic device, where the electrical interface comprises a pair of bias voltage providing connection points including a first connection point and a second connection point for biasing a signal providing element of the accessory, the accessory comprising:
- a set of electrical branches comprising:
  - a first electrical branch comprising:
    - first means for dividing a voltage,
    - first means for switching said electrical branch to one connection point in the pair of bias voltage providing connection points, where said first means for switching is arranged to be actuated mechanically,
    - a first end to connect to said one connection point in the pair of bias voltage providing connection points, and
    - a second end to connect to another connection point of the electrical interface for changing a voltage level of the connection point connected to said first end to another voltage level when said first means for switching interconnects said first means for dividing a voltage and the connection point connected to the first end; and
  - a second electrical branch comprising:
    - second means for dividing a voltage,
    - second means for switching that is arranged to be actuated mechanically, and
    - third and fourth ends that connect to the same connection points as the first and second ends of the first branch,
    - where said second means for dividing a voltage changes the voltage level of the connection point connected to the third end to a voltage level that is different than voltage levels provided by other branches that connect to the connection point connected to the third end when said second means for switching interconnects said second voltage dividing element and the connection point connected to the third end.

* * * * *